(12) United States Patent
Malets et al.

(10) Patent No.: US 9,722,889 B2
(45) Date of Patent: Aug. 1, 2017

(54) FACILITATING HIGH QUALITY NETWORK DELIVERY OF CONTENT OVER A NETWORK

(71) Applicant: Rawllin International Inc., Tortola (VG)

(72) Inventors: Konstantin Malets, Saint-Petersburg (RU); Anton Prokopenko, Saint-Petersburg (RU)

(73) Assignee: VIGO SOFTWARE LTD, Nicosia (CY)

( * ) Notice: Subject to any disclaimer, the term of this patent is extended or adjusted under 35 U.S.C. 154(b) by 579 days.

(21) Appl. No.: 14/053,545

(22) Filed: Oct. 14, 2013

(65) Prior Publication Data

US 2015/0106501 A1    Apr. 16, 2015

(51) Int. Cl.
*G06F 15/173* (2006.01)
*H04L 12/24* (2006.01)

(52) U.S. Cl.
CPC ...... *H04L 41/5041* (2013.01); *H04L 41/5019* (2013.01); *H04L 41/509* (2013.01); *H04L 41/5032* (2013.01); *H04L 41/5035* (2013.01)

(58) Field of Classification Search
CPC ............ H04L 41/5041; H04L 41/5019
USPC .................................. 709/224, 223
See application file for complete search history.

(56) References Cited

U.S. PATENT DOCUMENTS

| | | | |
|---|---|---|---|
| 5,910,951 A | 6/1999 | Pearce et al. | |
| 6,963,741 B2 | 11/2005 | Johansson et al. | |
| 7,809,387 B2 | 10/2010 | Chaudry et al. | |
| 7,870,231 B2 | 1/2011 | Mudireddy et al. | |
| 8,275,385 B2 | 9/2012 | Goransson et al. | |
| 8,331,307 B2 | 12/2012 | Bui | |
| 2002/0062395 A1 | 5/2002 | Thompson et al. | |
| 2004/0003032 A1* | 1/2004 | Ma .................... | G06F 17/3089 709/203 |
| 2009/0081996 A1 | 3/2009 | Duggal et al. | |
| 2009/0227259 A1* | 9/2009 | Min .................... | H04W 84/005 455/446 |
| 2009/0279489 A1 | 11/2009 | Deu-Ngoc et al. | |

(Continued)

FOREIGN PATENT DOCUMENTS

| | | |
|---|---|---|
| EP | 2337414 A1 | 6/2011 |
| WO | 2011085822 A1 | 7/2011 |

*Primary Examiner* — Suraj Joshi
*Assistant Examiner* — Joel Mesa
(74) *Attorney, Agent, or Firm* — Amin, Turocy & Watson, LLP

(57) ABSTRACT

Providing for improved efficiency in delivery of content over a network is described herein. By way of example, a metric of communication related to electronic communication between a device and a network access point can be obtained and utilized to calculate or infer a resource load associated with delivering the content to the device. If the metric of communication indicates a resource load that exceeds a predetermined measure, a message can be sent to a content server originating the provisioning of content for the device. In particular aspects, the message can instruct the content server to reduce a resource-impacting characteristic of the content, or transmission of the content. The metric of communication can continue to be monitored, and the change to the resource-impacting characteristic can be maintained or revoked based on subsequent indications of the metric of communication.

30 Claims, 10 Drawing Sheets

(56) References Cited

U.S. PATENT DOCUMENTS

| | | |
|---|---|---|
| 2010/0177704 A1 | 7/2010 | Rajkotia |
| 2011/0258338 A1* | 10/2011 | Vass .................. H04N 7/148 |
| | | 709/233 |
| 2012/0064908 A1 | 3/2012 | Fox et al. |
| 2012/0108250 A1 | 5/2012 | Ahn et al. |
| 2012/0207063 A1 | 8/2012 | Shaw |

* cited by examiner

FACILITATING HIGH QUALITY NETWORK DELIVERY OF CONTENT OVER A NETWORK

TECHNICAL FIELD

The subject disclosure relates generally to network communication, e.g., one or more disclosed embodiments relate to providing support for high quality of service communications over a network.

BACKGROUND

Network communications are generally based on the client-server remote communication model. The client-server model designates a client device—often a content consumer—for accessing information on a server device. Although communication between such devices is typically two-way, the client device generally requests content and the server device generally retrieves and provides the content. Modern examples of client devices accessing content from a server on a network can include downloading an html page on the World Wide Web (web page) to view content posted to the web page, streaming media over the Internet, storing pictures onto a cloud server, or the like. Content is downloaded or uploaded via the server device, enabling the services offered by the server device, e.g., content, storage space, etc., to be consumed by the client device (or a user thereof).

Though network communications are known to have latency, data loss and other variable conditions that degrade quality or speed of traffic, redundancy is built into such communications to ensure that a requested resource will eventually be delivered to the client device. In a paradigm of downloaded data displayed on a device in which acquiring an accurate copy of the data is not in doubt, the main performance factor affecting user satisfaction is time taken to download and display data, after sending a request. However, in a paradigm of real-time communications or streaming media, additional conditions affect consumer satisfaction.

In the case of electronic voice communications, whether analog or digital, sufficient signal clarity, noise reduction and bandwidth are involved in providing a clear, uninterrupted and continuous audio representation of a speaker's voice to a listener. Video conferencing presents a similar challenge, with higher resource consumption. To convey audio and video together synchronously, and with good clarity, sufficient network resources are involved to encode and transmit both audio and video data at a sufficient speed among network devices. The number of resources to transmit audio and video over a network is generally much more than for audio alone, for instance, for higher resolutions of video (e.g., 720p resolution, 1080p resolution). Similarly, streaming media content, including streaming audio, streaming video, or streaming audio/video (e.g., an online video or cinematic movie), can involve relatively high bandwidth or data rates to deliver content to a client with sufficient continuity to provide an enjoyable playback experience. In the case of downloading a webpage, insufficient network resources to yield a fast data transfer can be merely a slight inconvenience, but where continuity of streaming media is involved, insufficient resources to provide audio/video continuity can significantly degrade user satisfaction with network-sourced content.

As illustrated with the data download paradigm to the streaming media content or real-time communication paradigm, changes in network communication technology can lead to new challenges in meeting customer expectations. Network communication technology is generally adapting and changing to meet these new expectations. These and other evolutions of communication technology drive much of modern research and development to keep up with consumer demand.

SUMMARY

The following description and the annexed drawings set forth in detail certain illustrative aspects of the disclosed subject matter. These aspects are indicative, however, of but a few of the various ways, or embodiments, in which the principles of the disclosed subject matter may be implemented. The disclosed subject matter is intended to include all such embodiments and their equivalents. Other advantages and distinctive features of the disclosed subject matter will become apparent from the following detailed description of the various embodiments when considered in conjunction with the drawings.

Aspects of the subject disclosure provide for improving communication resource efficiency for a network in the context of provisioning content to a device (e.g., a client device) over the network. In various aspects, a metric of communication between the device and a network access point can be obtained to calculate or infer a resource load caused by the device on the network access point. In response to the metric of communication causing the resource load to exceed a predetermined qualitative or quantitative measure, a message can be sent to a content server originating the provisioning of content for the device. In particular aspects, the message can instruct the content server to reduce a resource-impacting characteristic of the content, or transmission of the content. Under various communication conditions (e.g., a guaranteed quality of service condition), reducing the resource-impacting characteristic can alleviate resource load at the network access point, potentially improving capacity and efficiency of communications at the network access point.

In at least one embodiment of the subject disclosure, content delivery management is provided that can manage efficiency of network communications in conjunction with delivering content to a device over a network. For instance, where a guaranteed quality of service is enforced in conjunction with delivery of the content over a wireless interface, poor wireless conditions can significantly impact wireless communication resources involved in enforcing the guaranteed quality of service. Accordingly, a metric of wireless communication quality (e.g., qualitative, quantitative, . . . ) can be obtained that is indicative of a wireless communication characteristic between a device and a wireless network access point. In one or more aspects disclosed herein, the metric of wireless communication quality can be related to wireless resources allocated to the device in conjunction with delivering the content with a guaranteed quality of service policy. The metric can be analyzed in relation to a resource condition, defined by a function, and if the resource condition is met, a request is sent to an entity originating the content to modify the content or delivery of the content in a manner configured to reduce resource load at the network access point in conjunction with delivering the content to the device while enforcing the guaranteed quality of service policy. The metric of wireless communication can be further monitored and, in response to determining the metric no longer satisfies the resource condition, or alternatively satisfies a restoration condition, a request to revoke the modification of the content or delivery of the content can be sent to the entity originating the content. Thus, as one example, when radio conditions affecting a device become poor, a feature of content or content delivery detrimentally impacting resource load at the network access point can be stopped or mitigated in conjunction with delivering the content. If radio conditions are detected to improve, the feature can be restored.

In various disclosed aspects, the subject disclosure provides one or more methods. The method(s) can comprise monitoring, by a system comprising a processor, a metric of communication between a network access point device and a device, and determining an instance for which the metric satisfies a condition defined by a communication function. Moreover, the method(s) can comprise determining a network service providing content for the device and transmitting a message to the network service related to modifying a resource usage parameter of the network service in response to the metric being determined to satisfy the condition defined by the communication function.

In other disclosed aspects, the subject disclosure provides one or more systems. The system(s) can comprise a memory to store instructions and a processor, communicatively coupled to the memory, that executes or facilitates execution of the instructions. Moreover, the instructions can comprise a service component configured to determine activation of network delivery of content to a device that is connected to a network by a network access point device. Further, the instructions can comprise a monitoring component configured to obtain a quality metric related to a communication between the device and the network access point device and an error component configured to determine whether the quality metric satisfies an error condition defined by a communication function. In addition to the foregoing, the instructions can comprise a correction component configured to transmit a message to a network entity originating the content over the network in response to the communication problem being determined to satisfy the error condition. In at least one disclosed embodiment, the system(s) can be configured so that the message facilitates the network entity originating the content to alter the content or delivery of the content to facilitate reduced resource consumption at the network access point device in conjunction with the communication.

According to other embodiments, one or more additional systems are provided by the subject disclosure. Such system(s) can comprise a memory to store instructions and a processor, communicatively coupled to the memory, that executes or facilitates execution of the instructions. The instructions can comprise a transmission component configured to transmit content over a network targeting a client application operating on a device and a messaging component configured to receive a request to modify the content or delivery of the content in a manner configured to reduce resource consumption of a network access point device serving the device. Moreover, the instructions can comprise a mitigation component configured to perform the modification of the content or delivery of the content in response to the request.

In other embodiments, described is a computer-readable storage device comprising computer-executable instructions that, in response to execution, cause a system comprising a processor to perform operations. As an example, the operations can comprise initiating delivery of content have a guaranteed quality of service (QoS) rate over a network addressed to a client connected to the network and receiving an indication of communication quality observed at the client. Moreover, the operations can comprise determining whether the indication of communication quality satisfies a condition defined by a function that correlates client-measured communication quality with resource consumption associated with delivery of the content according to the guaranteed QoS rate and modifying the content or delivery of the content in a manner configured to reduce resource consumption associated with delivery of the content in response to determining the indication of communication quality satisfies the condition.

The following description and the annexed drawings set forth in detail certain illustrative aspects of the disclosed subject matter. These aspects are indicative, however, of but a few of the various ways in which the principles of the disclosed subject matter can be employed and the disclosed subject matter is intended to include all such aspects and their equivalents. Other advantages and novel features of the disclosed subject matter will become apparent from the following detailed description when considered in conjunction with the drawings.

DETAILED DESCRIPTION

Figure 1:
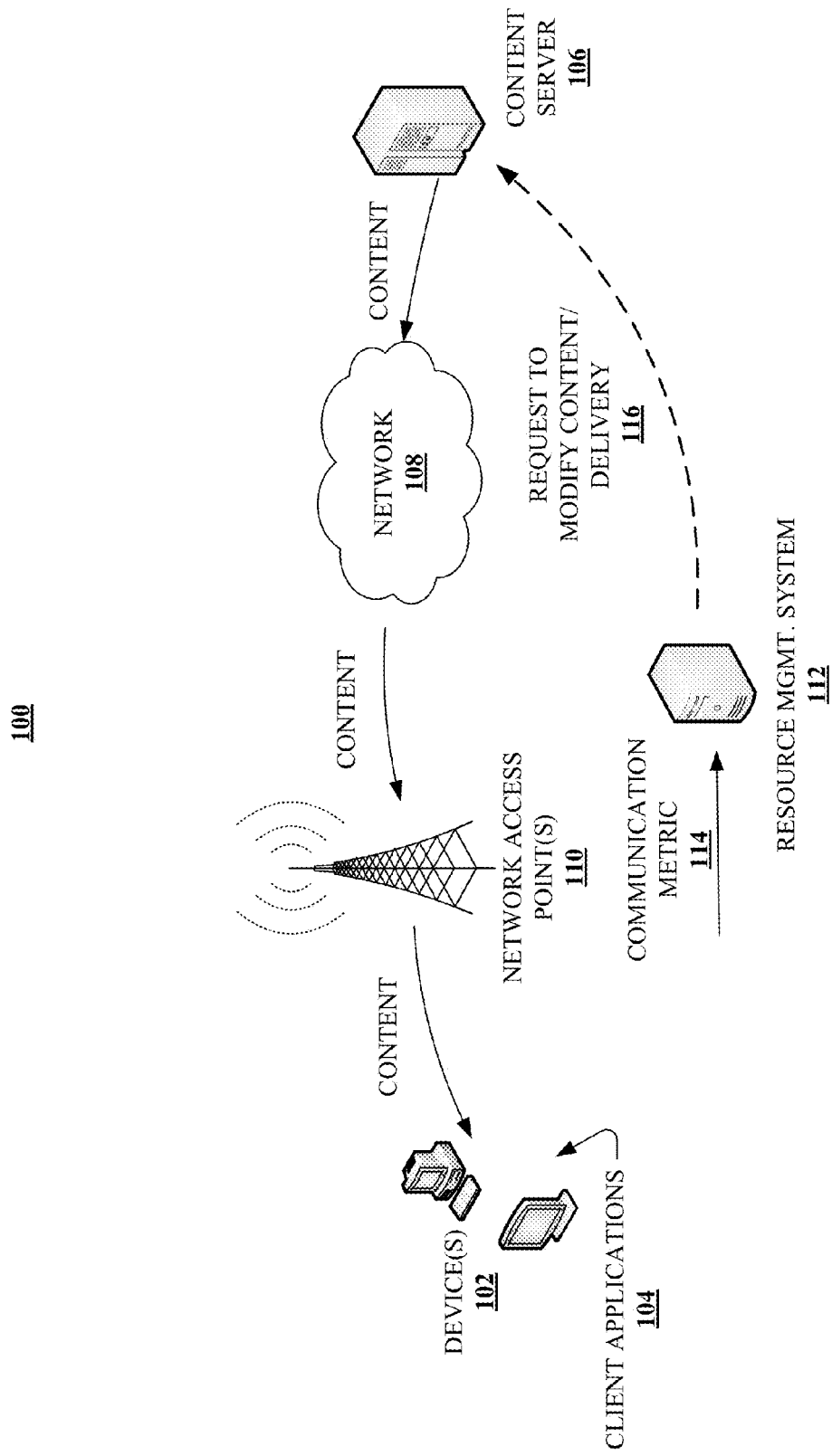
FIG. 1 illustrates a diagram of an example network communication for delivering content over a network according to embodiments of the subject disclosure.

The disclosed subject matter is described with reference to the drawings, wherein like reference numerals are used to refer to like elements throughout the description. In the following description, for purposes of explanation, numerous specific details are set forth in order to provide a thorough understanding of the disclosed subject matter. It may be evident, however, that the disclosed subject matter can be practiced without these specific details. In other instances, well-known structures and devices are shown in block diagram or schematic form in order to facilitate describing various aspects disclosed herein.

Reference throughout this specification to "one embodiment," "an embodiment," "a disclosed aspect," or "an aspect" means that a feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the features, structures, or characteristics may be combined in any suitable manner in various disclosed embodiments.

As utilized herein, terms "component," "system," "module", "interface," "user interface", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

Since the advent of network-based computer services, challenges involved in delivering network services to a dynamic population of devices have been a driving motive of new technology. For instance, each network access point whether wired or wireless has a finite amount of network resources to allocate to devices. Ideally, as many devices as attempt to access a network will be served by a network access point. However, because it is possible to have more client device demand than network resources to serve the demand, a conflict can exist with this goal of provisioning service to every client device attempting access.

In addition to the foregoing, new online content paradigms involve some sort of elevated QoS, elevated performance, or the like, to facilitate adequate consumer satisfaction. For instance, high quality voice over Internet protocol (VoIP) can involve elevated QoS related to continuity of audio communications, low jitter, noise reduction or signal clarity, to achieve sufficient consumer satisfaction. Likewise, streaming media services such as streaming movies or video conferencing can involve elevated performance in terms of sufficient bandwidth or data rates to convey high resolution video and audio, audio/video continuity to meet playback or participant expectations, and the like. Thus, as services become more complex, the technology for delivery of these services tends to become more demanding.

In many instances, the goal of serving all devices will conflict with the goal of meeting high demand services. Some attempts to address this conflict exist or have been theorized. For example, best effort traffic is a mechanism for giving service to as many subscribers as possible, with the resources available. However, the best effort traffic model can result in loss of service when available resources are insufficient to support the service. The guaranteed bit rate (GBR) model is intended in part to address this problem with the best effort traffic model. The GBR model allocates an amount of resources sufficient to provide a predetermined bit rate at the client device. This allocation is provided to subscribers in response to initiation of an application on a client device entitled to GBR service (e.g., as part of a subscription agreement associated with the client device). However, where poor network conditions exist between a network access point and the client device, far greater access point resources can be required to deliver the predetermined bit rate to the client. Enforcing the GBR service in such conditions can consume a much larger portion of access point resources than would otherwise by typical for delivering the content with the GBR service. This can cause several problems, ranging from dropped service for existing devices, network inaccessibility for new devices, or loss of the GBR service.

In some embodiments of the subject disclosure, the foregoing and similar problems can be addressed by mediating content features or content delivery features in response to communication conditions affecting resource load at a network access point. For instance, in at least one embodiment involving a device communicating with a network to acquire content, a communication condition observed at the device can be monitored. The communication condition can be selected to be, for instance, a communication condition that affects resource load at an access point to the network serving the device. In response to the communication condition satisfying a resource condition defined by a function (e.g., a function relating the communication condition to resource load at the access point to the network), an entity originating transmission of the content can remove or mitigate a content feature or content delivery feature that impacts the resource load at the access point. As one particular example, the entity can switch from a high data or processing feature related to the content (e.g., a high definition media standard) to a lower data or processing feature (e.g., a standard definition media standard). Removing or mitigating the high data or processing feature can ameliorate communication resource requirements at the access point to the network, mitigating occurrences of dropped service, network inaccessibility, or loss of the GBR service. Thus, in other words, the network can maintain the GBR service for delivering the content to the device while mitigating overconsumption of resources as a result of providing the GBR service in less than ideal communication conditions.

Referring now to the drawings, FIG. 1 illustrates a diagram of an example network environment 100 for delivering content to one or more devices via a network. Network environment 100 can comprise a set of devices 102 having one or more respective client applications 104 operating on respective ones of devices 102. In some aspects, client applications 104 can be clients of a particular network content or network service (referred to hereinafter collectively as content). A subscription associated with the network content can establish terms governing consumption of content by client applications 104 and transmitted by one or more content servers 106.

Examples of network content that could be employed in conjunction with network content communication of network environment 100 can include access to or playback of multimedia content, social media services, professional media services, communication content or services, news media, entertainment media or services, or the like. Examples of terms governing consumption of content can include best effort resource provisioning, guaranteed quality of service (QoS) resource provisioning (e.g., guaranteed bitrate [GBR], guaranteed bandwidth, guaranteed jitter rate, and so forth), amount of content to be accessed, rate of content access (e.g., amount per day, etc.), cost of accessing content, cost of accessing content having a particular feature (e.g., high definition multimedia, standard definition multimedia, high QoS audio content, high QoS voice and video content, and so on), cost of accessing content delivered according to a particular delivery feature (e.g., GBR policy, . . . ), or the like, or a suitable combination thereof. It should be appreciated that the subject disclosure is not limited to the example types of network content or terms governing consumption of content explicitly described above. Rather, other examples known in the art or made known to one of ordinary skill in the art by way of the context provided herein are considered within the scope of the subject disclosure.

Upon initiation of one of client applications 104 on a device 102, access to online content can be requested by a user of device 102. Client application 104 can be configured to provide user credentials or subscription information to a login authority (not depicted) associated with content server 106, to identify client application 104 or the user of device 102. Once identified, an associated content subscription can be accessed by content server 106 to retrieve suitable terms governing content or delivery of content to client application 104. Content can then be provided to device 102 and client application 104 via a network 108 (e.g., the Internet, an intranet, a local area network or wireless local area network, a wide area network or wireless wide area network, a cellular network, a mobile communication network, a Wi-Fi network, or the like, or a suitable combination thereof) and at least one access point 110 of network 108.

As mentioned above, where communication conditions observed at device 102 become relatively poor, communication resources of access point(s) 110 involved in delivering content to client application 104 can increase. The increase in communication resources can be exacerbated under certain terms of content delivery, such as a guaranteed QoS policy (e.g., a GBR policy, or the like). Accordingly, a resource management system 112 can be configured to acquire a communication metric 114 related to communication between device 102 and access point(s) 110. In some disclosed embodiments, communication metric 114 can be a metric related directly or indirectly to access point resources involved in delivering content to client application 104, or delivering content to client application 104 under one or more terms of content delivery. Accordingly, by accessing the type of content or terms of content delivery associated with the content, resource management system 112 can be configured to employ communication metric 114 to determine or to infer an impact on access point(s) 110 resources consumed in delivering the content to client application 104. If communication metric 114 satisfies a resource condition defined by a function (e.g., a function relating communication metric 114 directly or indirectly to an amount of access point(s) 110 resources), resource management system 112 can transmit a request 116 to content server 106 configured to alleviate the impact on access point(s) 110 resources consumed in delivering the content to client application 104. As one example, the function relating communication metric 114 with the amount of access point(s) 110 resources can specify an amount of increased resources required to maintain a term of content of content delivery under a given metric of communication quality. Where communication metric 114 implies an increase in resources that passes a threshold increase in resources, resource management system 112 can be configured to transmit request 116.

In at least one alternative embodiment, resource management system 112 can first check availability of network resources at access point(s) 110 before sending request 116. In this latter embodiment(s), resource management system can refrain from sending request 116 so long as resource consumption at access point(s) 110 does not pass a predetermined metric (e.g., a predetermined value, a percentage, a threshold, etc.). Once the predetermined metric of resource consumption is passed, or in response to an increase in resource consumption as a result of communication metric 114, or the like or a suitable combination thereof, resource management system 112 can be configured to transmit request 116 to content server 106.

Request 116 can be configured to instruct content server 106 to modify content or content delivery so as to alleviate the increase in resource consumption at access point(s) 110 resulting from delivering content to client application 104. In some aspects, modifying the content can include reducing an amount of data included in the content, or features associated with the content that increase communication resources to deliver the content. In response to modifying the content or the delivery of the content, resource management system 112 can again acquire a metric of communication 114 pertaining to device 102 and access point(s) 110. Upon metric of communication 114 subsequently satisfying a second condition related to restoring content or delivery of content to a previous quality (e.g., before being modified in response to request 116), a second request can be sent to content server 106 to revoke the modification of the content or delivery of the content. Accordingly, when resource management system 112 detects a predetermined improvement in communication conditions associated with resource consumption at access point(s) 110, the modification can be revoked. This revocation can be performed to, where possible, restore delivery of the content or the content to a condition prior to the modification.

Figure 2:
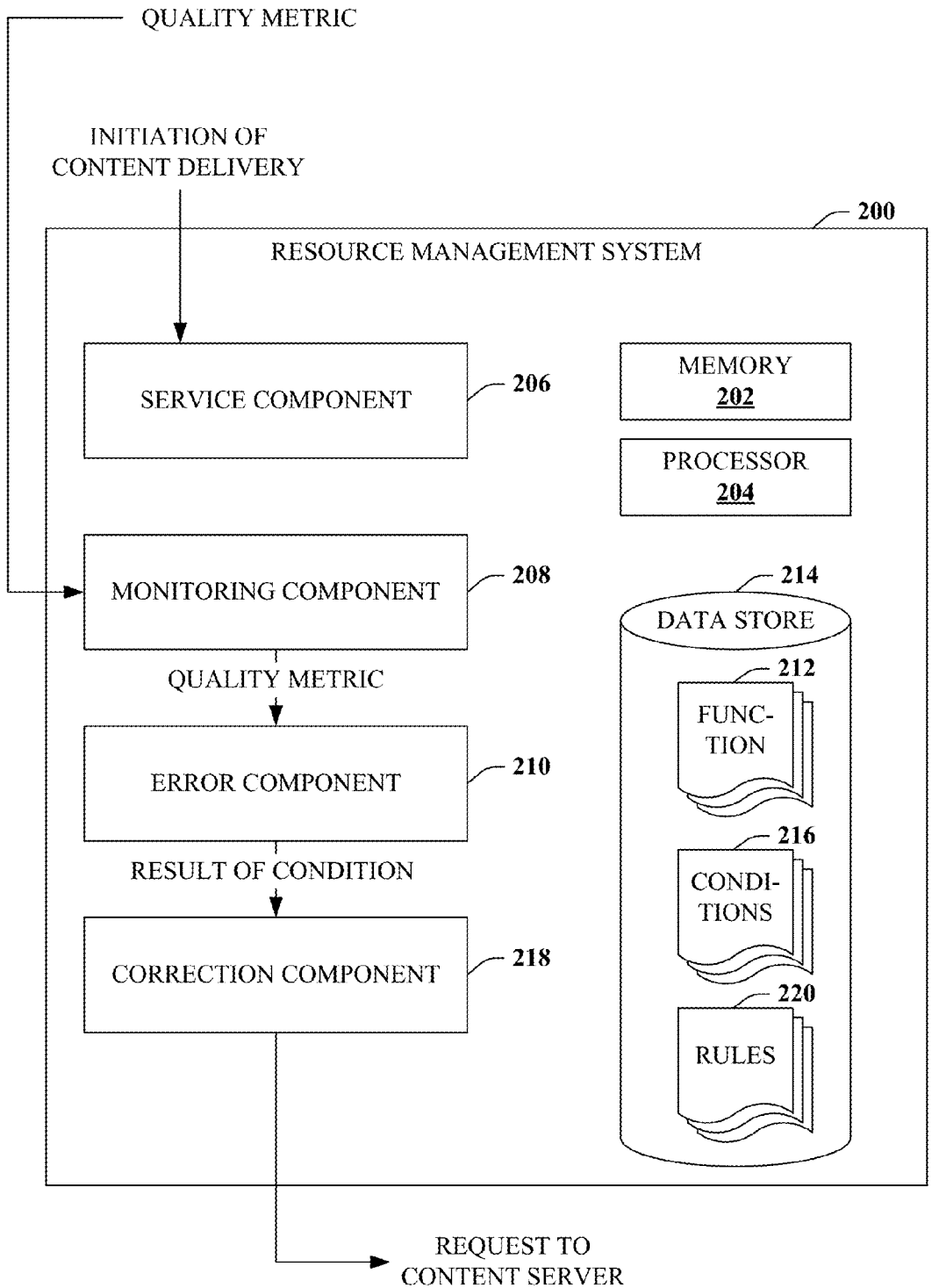
FIG. 2 depicts a block diagram of an example resource management system for efficient resource utilization in conjunction with network content delivery.

FIG. 2 illustrates a block diagram of an example resource management system 200 according to alternative or additional aspects of the subject disclosure. In some disclosed embodiments, resource management system 200 can be substantially similar to resource management system 112 of FIG. 1. However, the subject disclosure is not so limited; rather, resource management system 200 can have a subset of the features described with respect to resource management system 112, none of those features, or additional features described below or elsewhere herein, or a suitable combination thereof.

As depicted, resource management system 200 can comprise a memory 202 for storing instructions, and a processor 204, communicatively coupled to memory 202, which executes or facilitates execution of the instructions. Such instructions can include components thereof that are stored or implemented in hardware, or components thereof that are stored or implemented in software or firmware by one or more hardware components (e.g., processor 204, memory 202, a controller, a bus, a communication interface, a hardware interface, a memory interface, a processor interface, and so forth), or the like, or a suitable combination thereof.

In some embodiments, resource management system 200 can comprise a service component 208 configured to identify activation of network delivery of content to a device. The device can be, for instance, a device that is connected to a network by a network access point. Additionally, resource management system 200 can comprise a monitoring component 208 configured to obtain a quality metric related to a communication between the device and the network access point. The communication can be a suitable electronic communication, including a wired communication, a wireless communication, or a communication involving a wired communication in conjunction with a wireless communication. Furthermore, the quality metric can be a metric (e.g., QoS metric, interference metric, packet loss metric, jitter metric, noise metric, or the like or a suitable combination thereof) affecting access point resources (e.g., bandwidth, channel allocation, buffer resources, etc.) involved in enforcing a content or content delivery policy (e.g., a high definition policy, a guaranteed QoS policy, a GBR policy, a guaranteed bandwidth policy, a guaranteed packet loss or jitter policy, . . . ), in at least one disclosed embodiment.

In addition to the foregoing, resource management system 200 can comprise an error component 210. Error component 210 can receive the quality metric from monitoring component 208, and can be configured to determine whether the quality metric satisfies an error condition defined by a communication function. The communication function can be stored in a function file 212 of a data store 214. Upon receiving the quality metric, error component can retrieve the communication function from function file 212 as well as one or more relevant communication conditions stored in a communication conditions file 216. The relevant communication conditions can include, for instance, conditions pertaining to physical characteristics of a communication channel between a device and an access point affecting access point resource consumption, conditions related to terms of content delivery (e.g. GBR, . . . ) or content characteristics (e.g., high definition multimedia, . . . ), and so forth. Utilizing the function, the quality metric or the communication conditions, error component 210 can obtain a result related to the error condition defined by the communication function. The result can be forwarded by error component 210 to a correction component 218.

Correction component 218 can be configured to take one or more actions in response to the result provided by error component 210. Actions to be taken can be determined with references to one or more rules stored in a rules file 220 of data store 214. Correction component 218 can retrieve the appropriate rule matching the result related to the error condition. For instance, in response to the error condition being satisfied, the rules can require transmitting a message to a network entity originating the content over the network. The message can be configured, as one example, to facilitate the network entity to alter the content or delivery of the content in a manner configured to facilitate reduced resource consumption at the network access point. As another example, in response to the error condition not being satisfied, the rules can require no action by correction component 218. In this case, no message is sent to the entity originating the content. As yet another example, in response to the error condition having previously been met and subsequently not being met (or in response to the quality metric satisfying a restoration condition related to revoking an earlier modification of content or content delivery), correction component 218 can be configured to send a second message to the network entity, instructing the network entity originating the content to restore the content or delivery of the content, to a condition prior to the alternation.

Based on the foregoing, resource management system 200 can be configured to request changes in network content in response to a communication condition(s) between a device and an access point. Where the communication condition(s) satisfies conditions related to alleviating resource consumption at the access point, changes can be initiated at a device originating the content that can implement the alleviating resource consumption. Although some solutions might alleviate resource consumption by switching to a best effort policy at the access point, various aspects of the subject disclosure can reduce resource consumption without changing a policy at the access point. Thus, the access point can proceed with a guaranteed QoS policy for delivery of content while still receiving the benefit of reduced resource allocation to the device in consumption with enforcing the guaranteed QoS policy. This can occur even for deteriorating communication conditions between the access point and the device. Solutions that switch to best effort policy cannot maintain the user experience associated with guaranteed QoS while alleviating resource allocation involved in delivering guaranteed QoS in the face of the deteriorating conditions.

Figure 3:
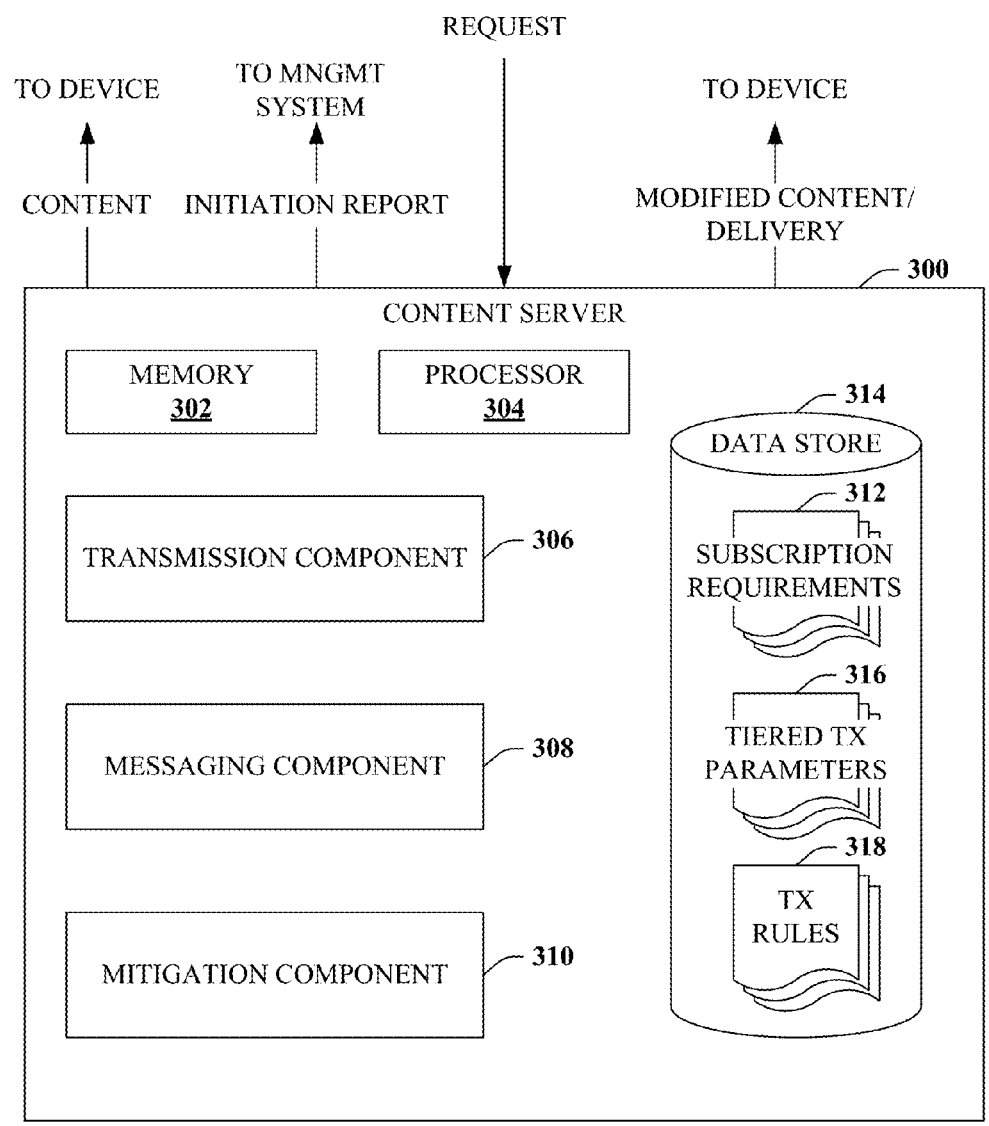
FIG. 3 depicts a block diagram of a sample content server for facilitating efficient network content delivery according to additional embodiments.

FIG. 3 depicts a block diagram of an example content server 300 according to other disclosed embodiments. In at least one embodiment, content server 300 can be substantially similar to content server 106 of FIG. 1. However, the subject disclosure is not so limited; rather, in other embodiments content server 300 can include a subset of the features described for content server 106, none of those features, or additional features described below or elsewhere herein, or a suitable combination thereof.

Content server 300 can comprise a memory 302 to store instructions and a processor 304, communicatively coupled to memory 302, configured to execute or facilitate execution of the instructions. Such instructions can include components thereof that are stored or implemented in hardware, or components thereof that are stored or implemented in software or firmware by one or more hardware components (e.g., processor 304, memory 302, a controller, a bus, a communication interface, a hardware interface, a memory interface, a processor interface, and so forth), or the like, or a suitable combination thereof.

Content server 300 can additionally comprise a transmission component 306 configured to transmit content over a network targeting a client application operating on a device. The device can be, for instance, communicating with the network via a communication channel between the device and an access point(s) to the network. Transmission of the content can be in response to a request for such content by the client application. Additionally, transmission of the content can be in accordance with one or more terms governing the content or delivery of the content, such as a resolution, definition, quality, etc. of the content, or QoS, bitrate, bandwidth, packet loss, etc., of the delivery of the content. Terms governing the content or delivery of the content can be stored in a subscription requirements file 312 by a data store 314 of content server 300. In at least one aspect of the subject disclosure, content server 300 can be configured to notify a resource management system of the initiation of delivery of the content to the client application.

Further to the above, content server 300 can comprise a messaging component 308 configured to receive a request to modify the content or delivery of the content. The request can be received from the resource management system notified above. Additionally, the request can specify a modification of the content or delivery of the content in a manner configured to reduce resource consumption of a network access point serving the device. A mitigation component 310 can be configured to perform the modification of the content or delivery of the content in response to the request.

In some aspects, the modification can be according to a set of tiered transmission parameters stored in a tiered transmission parameters file 316. The tiered transmission parameters can provide a set of terms governing the content or delivery of the content, ordered according to affect on resource consumption at an access point of a network. In response to receiving the request to modify the content or delivery of the content, mitigation component 310 can obtain a next lower tiered transmission parameter (configured to consume fewer access point resources than a higher tiered transmission parameter), and modify the content or delivery of the content according to the next lower tiered transmission parameter. Multiple requests received by content server 300 to modify resources can result in progressively lower tiered transmission parameters being applied to the content or delivery of the content. Likewise, if content server 300 receives a message to revoke a modification, or restore one or more of the tiered transmission parameters, mitigation component 310 can retrieve the next higher tiered transmission parameter, or the requested one or more tiered transmission parameters, and provide the tiered transmission parameter(s) to transmission component 306 to alter the content or delivery of the content accordingly. A manner in which mitigation component responds to a received request can be governed by transmission rules stored in a transmission rules file 318 of data store 314.

Figure 4:
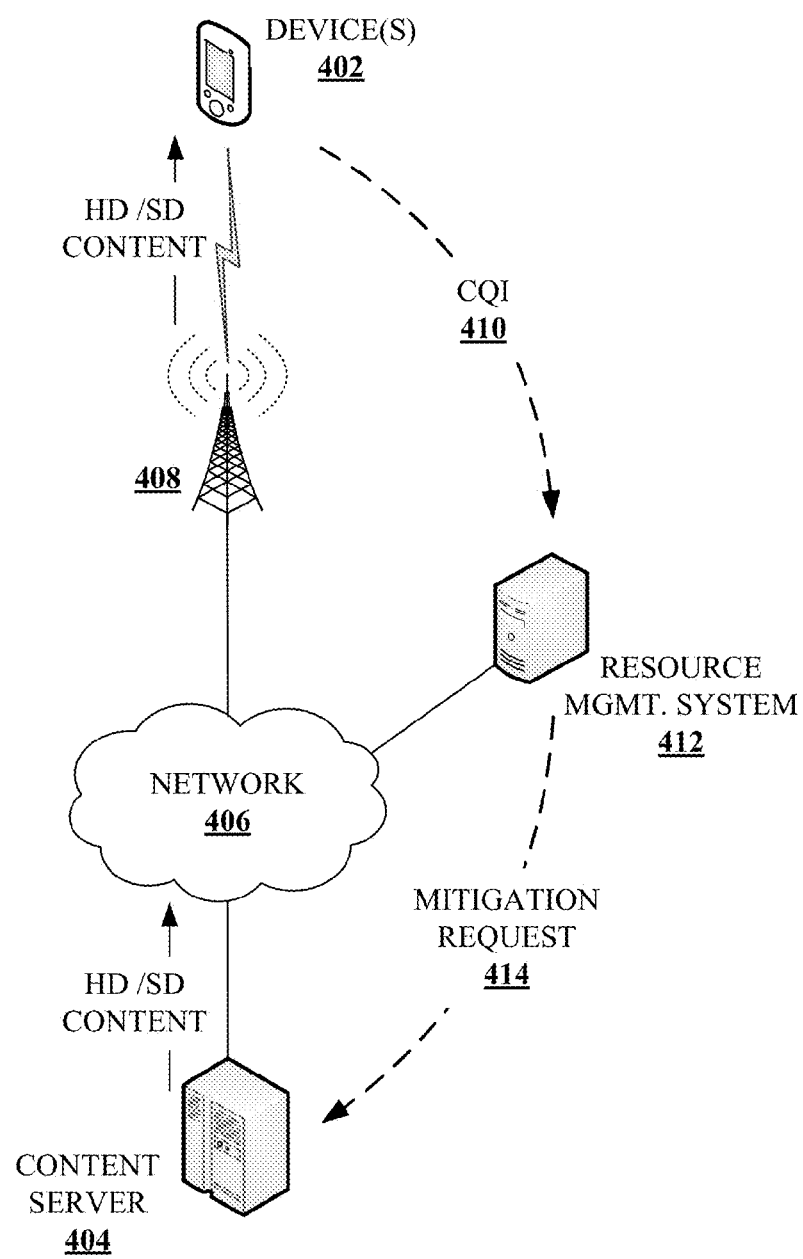
FIG. 4 illustrates a diagram of efficient content delivery in a wireless communication environment, according to further embodiments.

FIG. 4 depicts a diagram of an example wireless environment 400 facilitating efficient access point resource utilization in conjunction with wireless content delivery to a device, according to one or more additional aspects of the subject disclosure. Wireless environment 400 can comprise one or more devices 402 communicating via a wireless channel with an access point 408 to a network 406. Device(s) 402 can be a mobile device, a cellular phone, a smart phone, a personal digital assistant, a tablet computer, a laptop, or other suitable device configured to consume content (e.g., audio content, video content, voice content, media content, multimedia content, web-browsing content, and so forth) obtained via a wireless exchange of content.

A content server 404 can be configured to receive a request for high definition (HD) content from a client application operating on device(s) 402. According to one or more embodiments, the client application can be associated with a subscription account maintained by content server 404. The subscription account can have one or more terms regulating access to content, including HD content, standard definition (SD) content, or the like. The terms can specify cost of accessing respective types of content, QoS parameters (e.g., bandwidth, bitrate, jitter, packet loss, . . . ) to be maintained when delivering the content, policy for delivering the content via the QoS parameters (e.g., a best effort policy, a guaranteed policy, and so on), or the like, or a suitable combination thereof.

According to one or more embodiments, content server 404 can receive a request for HD content from a client application on device(s) 402. In response to the request for HD content, content server 404 can access the HD content, and transmit the HD content over network 406 and access point 408 to device(s) 402. Transmission of the content can be in accordance with the terms contained with a subscription account associated with the client application, as described above. For instance, because HD content is often expected to be associated with good quality playback at device(s) 402, transmission of the HD content can be implemented in conjunction with a guaranteed QoS policy (e.g., a GBR policy, or the like).

After initiating transmission of the HD content, content server 440 can transmit a notice to a resource management system 112 in an embodiment. The notice can facilitate resource management system 112 identifying device(s) 402 or the client application, and acquiring information pertaining to the wireless channel employed by access point 408 to communicate with device(s) 402. In at least one embodiment, an instruction can be transmitted to device(s) 402 or the client application to report a channel quality indicator (CQI) associated with a wireless downlink channel, in conjunction with receiving the HD content. The instruction can be transmitted by resource management system 412, content server 404, or access point 408. In response, device(s) 402 or the client application can monitor the CQI over time and submit a CQI report 410 to resource management system 412 including the metric of the CQI. CQI report 410 can be re-transmitted with an updated metric of the CQI periodically, in response to further requests, or in some other suitable periodic or a-periodic manner.

Upon receiving the metric of CQI, resource management system 412 can determine whether the metric of CQI satisfies a resource condition defined by a function. The resource condition can indicate, for instance, a predetermined amount of resources that can be allocated to delivering the HD content to device(s) 402 while enforcing the guaranteed QoS policy. In some embodiments, the predetermined amount of resources can vary based on availability of wireless resources, or resource loading, reported by access point 408 (e.g., when availability is relatively high, the predetermined amount can increase; when availability is relatively low, the predetermined amount can decrease, etc.). If the resource condition is satisfied by the metric of CQI, resource management system 412 can submit a mitigation request 414 to content server 404 to switch the content from HD content to SD content. SD content generally has a lower resolution characteristic for multimedia content, and therefore less data and lower datarate requirements. The lower datarate requirements can significantly reduce an amount of resources of access point 408 involved in delivering the content, particularly at a guaranteed QoS. Thus, by switching to SD content when resource load at access point 408 satisfies a predetermined resource condition, the content can still be delivered according to the guaranteed QoS policy.

Following transmission of mitigation request 414, resource management system 412 can continue to receive CQI report 410, and optionally resource loading information from access point 408. Further, if the metric of CQI fails to satisfy the resource condition (or satisfies a restoration condition associated with resources allocated to delivering content to device(s) 402 drops below a second predetermined amount of resources, which can be the same as the predetermined amount of resources in some embodiments), resource management system 412 can submit a restoration message (not depicted) to content server 404. In response to receiving the restoration message, content server 404 can again transmit the content as HD content, and terminate transmitting the content as SD content.

Figure 5:
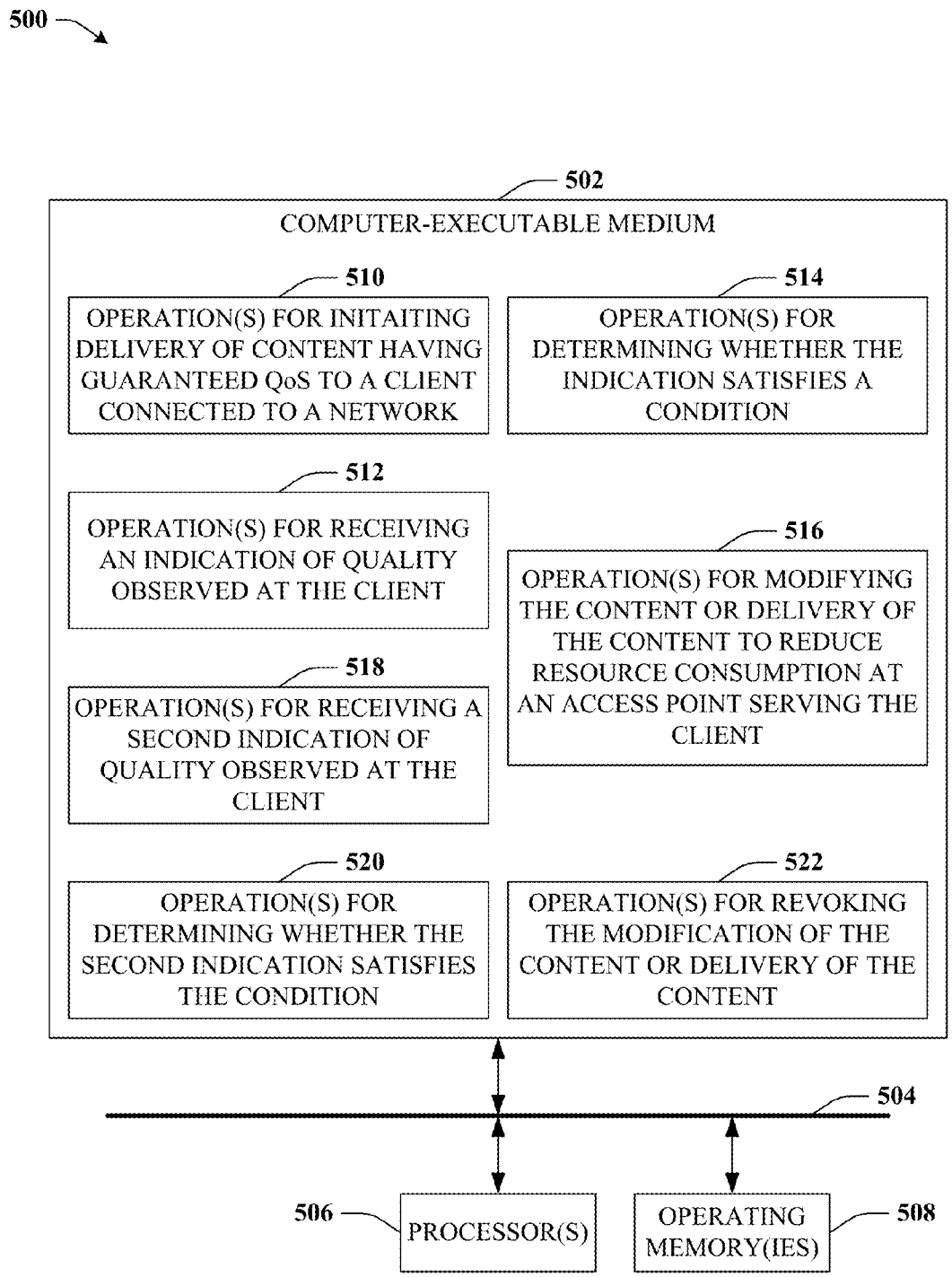
FIG. 5 illustrates a block diagram of an example operating system to facilitate efficient content delivery in a network environment.

FIG. 5 illustrates a block diagram of an example apparatus 500 for implementing one or more aspects of the subject disclosure. In one or more embodiments, apparatus 500 can be configured for providing efficient management of access point resources in conjunction with transmission of content over a network. For instance, apparatus 500 can reside at least partially within a communication network or within a network server such as a network node, network gateway, terminal device, personal computer coupled with a network interface card, or the like. It is to be appreciated that apparatus 500 is represented as including functional blocks, which can be functional blocks that represent functions implemented by a hardware, software, or combination thereof (e.g., firmware). In some aspects, the functional blocks can represent non-transitory computer-executable media, such as a storage media, a volatile memory media, a non-volatile memory media, and so forth. In other aspects, the functional blocks can represent transitory computer-executable media such as a signal, a communication media, and so forth.

Apparatus 500 can comprise a computer-executable medium 502 comprising one or more computer-executable instructions that can be accessed over a data communication interface 504. Data communication interface 504 can include a communication bus, a media reader (e.g., disc reader, disk reader, driver reader, . . . ), a data ribbon, a wired data interface or data medium, a wireless data interface or data medium, a network communication interface, a network signaling interface, or the like, or a suitable combination thereof. Additionally, the computer-executable instructions can be stored in an operating memory(ies) 508 or executed by a processor(s) 506 to facilitate functionality of apparatus 500.

Computer-executable medium 502 can comprise an operation(s) 510 for initiating delivery of content having a guaranteed QoS policy over a network. The delivery of content can be addressed to a client (e.g., a client application, a client device, etc.) connected to a network via a network access point. Additionally, computer-executable medium 502 can comprise an operation(s) 512 for receiving an indication of communication quality observed at the client. In some embodiments, the indication of communication quality can include a metric of CQI related to a wireless channel employed by the client to communicate with the access point. Also, computer-executable medium 502 can comprise an operation(s) 514 for determining whether the indication of communication quality satisfies a condition defined by a function. In an embodiment, the function can be a function configured to correlate client-measured communication quality with resource consumption associated with delivery of the content according to a quality constraint (e.g., the guaranteed QoS policy). Further to the above, computer-executable medium 502 can comprise an operation(s) 516 for modifying the content or delivery of the content in a manner configured to reduce resource consumption associated with delivery of the content in response to determining the indication of communication quality satisfies the condition.

According to one or more alternative or additional embodiments, computer-executable medium 502 can comprise an operation(s) 518 for receiving a second indication of communication quality observed at the client. Further according to this embodiment(s), computer-executable medium 502 can comprise an operation(s) 520 for determining whether the second indication of communication quality satisfies the condition defined by the function, or whether the second indication satisfies a second condition (e.g., a restoration condition). Further, computer-executable medium 502 can comprise an operation(s) 522 for revoking the modification to the content or to the delivery of the content, in response to determining the second indication of communication quality does not satisfy the condition (or in response to the second indication satisfying the restoration condition).

The aforementioned diagrams have been described with respect to interaction between several systems, apparatuses, components, user interfaces, networks, network interfaces, or the like. It should be appreciated that such diagrams can include those components or systems specified therein, some of the specified components, or additional components. For example, system 100 could include device(s) 102, network access point(s) 110, network 108, resource management system 200 and content server 300, as one possible example. Sub-components could also be implemented as components electrically connected to other sub-components rather than included within a parent component. Additionally, it should be noted that two or more components could be combined into a single component providing aggregate functionality. For instance, monitoring component 208 can include error component 210 to facilitate acquiring a metric of communication quality and determining whether the metric satisfies a condition defined by a function, by way of a single component. Components of the disclosed systems and apparatuses can also interact with one or more other components not specifically described herein but known by those of skill in the art, or made known to one of skill in the art by way of the context provided herein.

Figure 6:
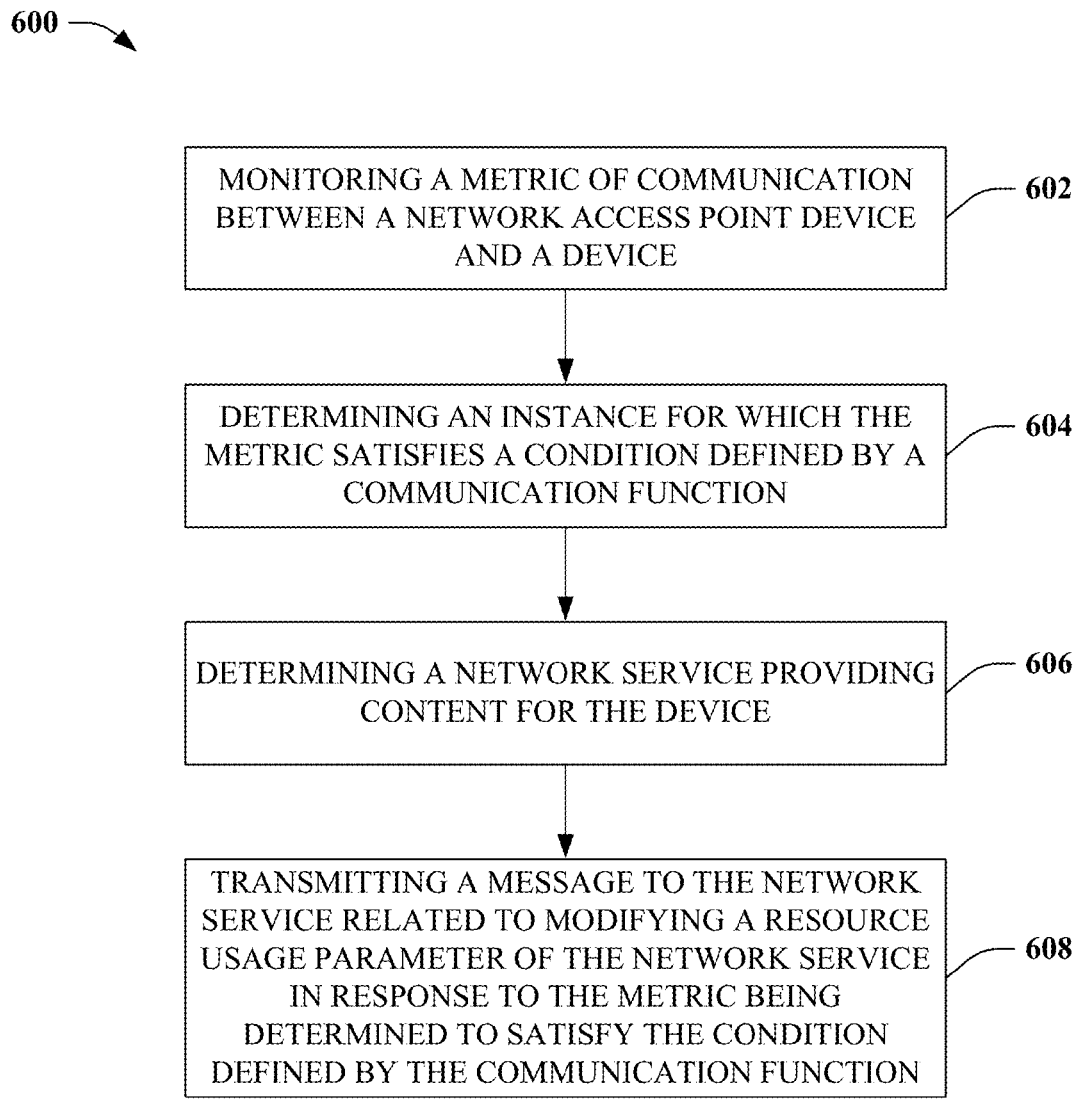
FIG. 6 depicts a flowchart of a sample method for provisioning content over a network according to one or more disclosed aspects.
Figure 7:
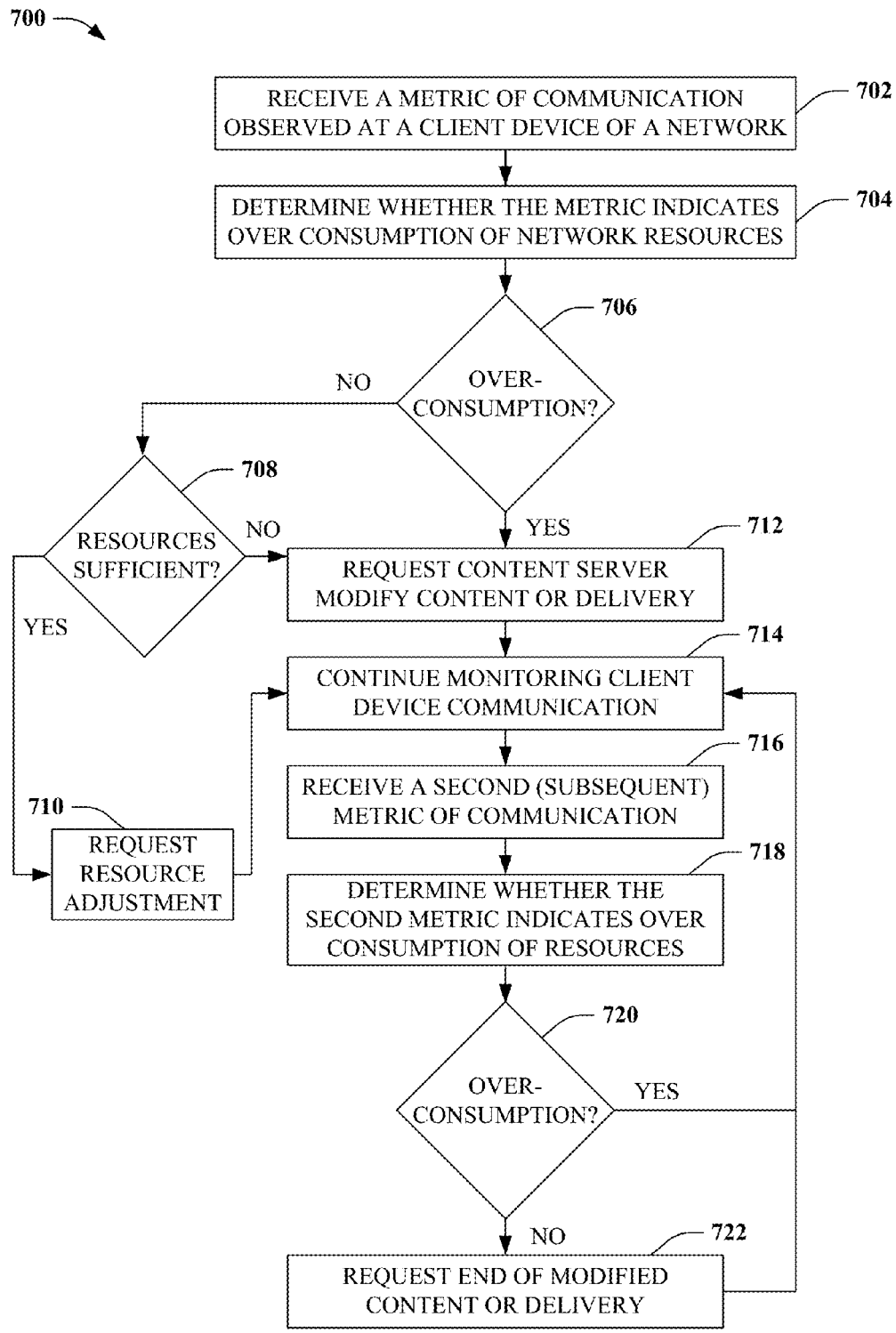
FIG. 7 illustrates a flowchart of a sample method for managing delivery of content over a network in response to communication conditions observed by a device.
Figure 8:
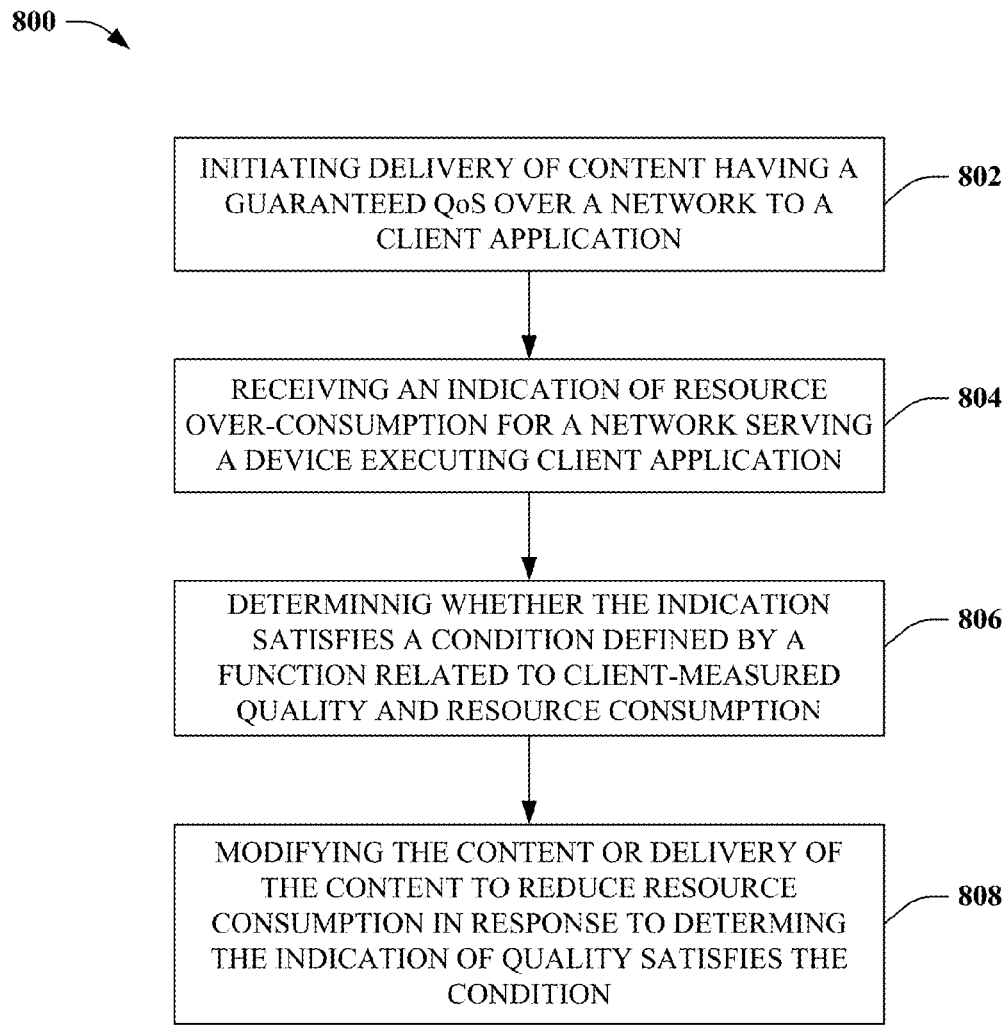
FIG. 8 illustrates a flowchart of a sample method for modifying content features in conjunction with a guaranteed quality of service network environment.

In view of the exemplary diagrams described supra, process methods that may be implemented in accordance with the disclosed subject matter will be better appreciated with reference to the flow charts of FIGS. 6, 7 and 8. While for purposes of simplicity of explanation, the methods are shown and described as a series of blocks, it is to be understood and appreciated that the disclosed subject matter is not limited by the order of the blocks, as some blocks may occur in different orders or concurrently with other blocks from what is depicted and described herein. Moreover, not all illustrated blocks may be required to implement the methods described herein. Additionally, it should be further appreciated that the methods disclosed herein are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

Referring now to FIG. 6, there is depicted a flowchart of an example method 600 for delivering content over a network. Method 600 can comprise monitoring a metric of communication between a network access point device and a device. The metric of communication can include a CQI metric in the context of a wireless communication, as one example. At 604, method 600 can comprise determining an instance for which the metric satisfies a condition defined by a communication function. In some embodiments, the condition can include a resource loading condition pertaining to consumption of resources of the network access point in conjunction with delivering content to the device as part of the communication. In at least one embodiment, delivering the content to the device can include enforcement of a guaranteed QoS policy. In an alternative or additional embodiment, the communication function can be a function correlating communication conditions observed by a device to resource load on a network access point serving the device.

In addition to the foregoing, at 606, method 600 can comprise determining a network service providing content for the device. At 608, method 600 can comprise transmitting a message to the network service related to modifying a resource usage parameter of the network service in response to the metric being determined to satisfy the condition defined by the communication function. In some embodiments, modifying the resource usage parameter can comprise modifying the content or delivery of the content in a manner that reduces network access point resources in conjunction with delivering the content to the device in conjunction with a guaranteed QoS policy. In at least one embodiment, modifying the resource usage parameter can comprise terminating transmission of content according to an HD standard, and initiating transmission of the content according to an SD standard.

FIG. 7 depicts a flowchart of an example method 700 for efficient management of access point resources for network content delivery, according to additional embodiments. At 702, method 700 can comprise receiving a metric of communication observed at a device communicating with a network (e.g., a client device, a device operating a client application, and so on). At 704, method 700 can comprise determining whether the metric indicates over consumption of network resources at an access point serving the device. At 706, a determination can be made as to whether over-consumption of resources has been identified. If over-consumption has been identified, method 700 can proceed to 714; otherwise, method 700 can proceed to 708.

At 708, method 700 can comprise determining whether sufficient resources exist at the network access point to continue consumption of the resources by the device. If sufficient resources do not exist, method 700 can proceed to 712. If sufficient resources do not exist, method 700 can proceed to 710.

At 710, method 700 can comprise requesting a network access point to allocate additional network resources to the device to alleviate the over-consumption of network resources. From 710, method 700 can proceed to 712.

At 712, method 700 can comprise requesting a content server to modify content or delivery of the content in response to determining over-consumption of resources has occurred. At 714, method 700 can comprise continuing monitoring a characteristic of a communication channel employed by the device for receiving the content. At 716, method 700 can comprise receiving a second metric of communication (or, e.g., more generally, a subsequent metric of communication) from the device. At 718, method 700 can comprise comparing the second metric of communication to the over consumption of resources. At 720, a determination is made as to whether the over consumption has been identified with respect to the second metric of communication. If the over consumption has been identified with respect to the second metric of communication, method 700 can proceed to reference number 714. Otherwise, method 700 can proceed to 722.

At 722, method 700 can comprise requesting ending the modified content or delivery of the content. From 722, method 700 can proceed to reference number 714. From 722, method 700 can comprise continuing monitoring subsequent instances of the metric of communication to facilitate enforcing a guaranteed QoS policy while managing resource consumption at the network access point.

FIG. 8 depicts a flowchart of a sample method 800 according to one or more additional embodiments of the subject disclosure. At 802, method 800 can comprise initiating delivery of content having a guaranteed QoS policy over a network. In at least one embodiment, the delivery of the content can be addressed, for instance, to an application that is a client of a network service, operating on a device that is a client of the network.

At 804, method 800 can comprise receiving an indication of resource over-consumption for a network serving the device executing the client application. At 806, method 800 can comprise determining whether the indication satisfies a condition defined by a function related to client-measured quality and resource consumption. At 808, method 800 can comprise modifying the content or delivery of the content in a manner configured to reduce resource consumption at a network access point, in response to determining the indication of quality satisfies the condition.

Figure 9:
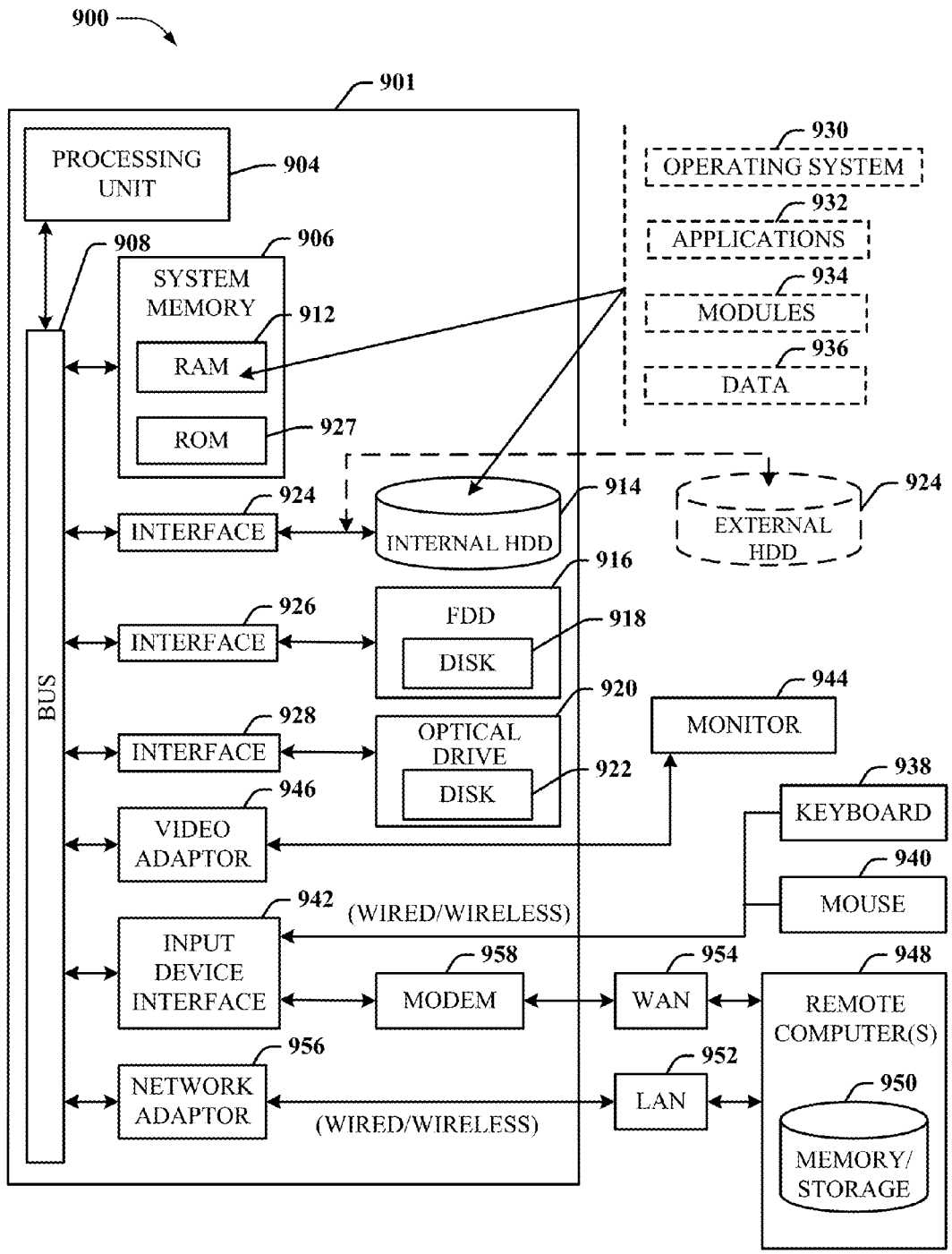
FIG. 9 depicts a block diagram of an example electronic computing environment that can be implemented in conjunction with one or more aspects.

With reference to FIG. 9, an exemplary environment 900 for implementing various aspects described herein includes a computer 902, the computer 902 including a processing unit 904, a system memory 906 and a system bus 908. The system bus 908 connects system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that aspects of the subject disclosure can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 can operate in a networked environment using logical connections by wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or can be connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi® and Bluetooth™ wireless technologies. Thus, the communication can be a predefined structure as with a conventional network or simply an ad hoc communication between at least two devices.

Wi-Fi, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), or other bands (e.g., 802.11g, 802.11n, . . . ) so the networks can provide real-world performance similar to the basic 10BaseT wired Ethernet networks used in many offices.

Figure 10:
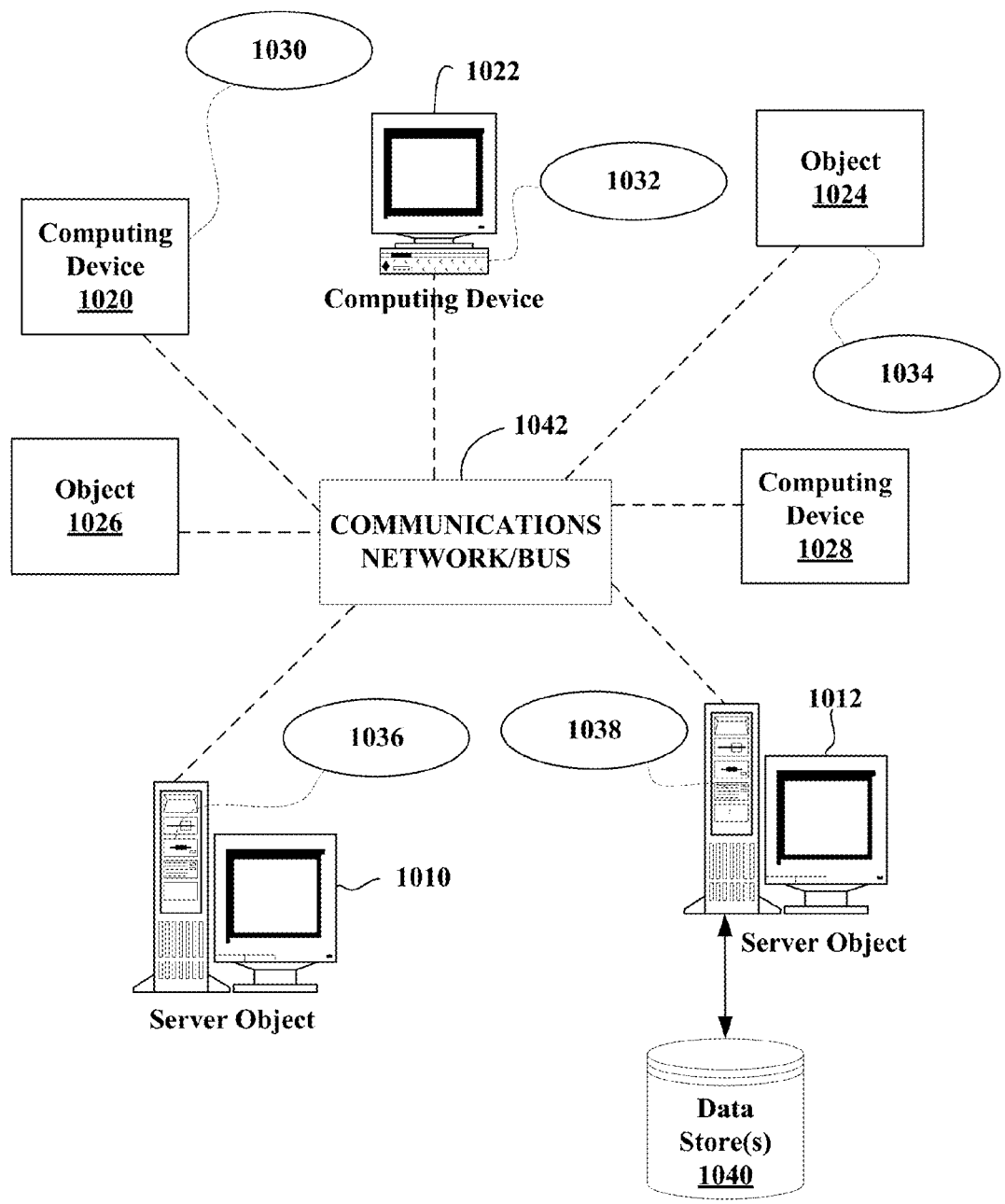
FIG. 10 illustrates a block diagram of an example data communication network that can be operable in conjunction with various aspects described herein.

FIG. 10 provides a schematic diagram of an exemplary networked or distributed computing environment. The distributed computing environment comprises server objects 1010, 1012, etc. and computing devices or objects 1020, 1022, 1024, 1026, 1028, etc., which may include programs, methods, data stores, programmable logic, etc., as represented by applications 1030, 1032, 1034, 1036, 1038 and data store(s) 1040. It can be appreciated that server objects 1010, 1012, etc. and computing devices or objects 1020, 1022, 1024, 1026, 1028, etc. may comprise different devices, including network access point(s) 110, resource management component 112, resource management component 200, content server 106, content server 300, or similar entities depicted within the illustrations, or other devices such as a network-enabled display device, network-enabled television, set-top box with network connection and display, satellite receiver and display, mobile phone, personal digital assistant (PDA), audio/video device, MP3 players, personal computer, laptop, etc. It should be further appreciated that data store(s) 1240 can include data store 214, data store 314, or another similar data store.

Each server object 1010, 1012, etc. and computing devices or objects 1020, 1022, 1024, 1026, 1028, etc. can communicate with one or more other server objects 1010, 1012, etc. and computing devices or objects 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, or may represent multiple interconnected networks, which are not shown. Each server object 1010, 1012, etc. or computing device or object 1020, 1022, 1024, 1026, 1028, etc. can also contain an application, such as applications 1030, 1032, 1034, 1036, 1038, that might make use of an API, or other object, software, firmware or hardware, suitable for communication with or implementation of the techniques for search augmented menu and configuration functions provided in accordance with various embodiments of the subject disclosure.

There is a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for search augmented menu and configuration functions as described in various embodiments.

Thus, a host of network topologies and network infrastructures, such as client/server, peer-to-peer, or hybrid architectures, can be utilized. One or more of these network topologies can be employed by device(s) 102, client application(s) 104, or network access point(s) 110, content server 106, network 108, resource management system 112, resource management system 200, content server 300, and others, for communicating with a network. The "client" is a member of a class or group that uses the services of another class or group to which it is not related. A client can be a process, e.g., roughly a set of instructions or tasks, that requests a service provided by another program or process. The client process utilizes the requested service, in some cases without having to "know" any working details about the other program or the service itself. A client device can be a computing device or object 1020, 1022, 1024, 1026, 1028 upon which a client process operates or is executed, in one or more disclosed aspects.

In a client/server architecture, such as a networked system, a client is usually a computer that accesses shared network resources provided by another computer, e.g., a server. In the illustration of FIG. 10, as a non-limiting example, computing devices or objects 1020, 1022, 1024, 1026, 1028, etc. can be thought of as clients and server objects 1010, 1012, etc. can be thought of as servers where server objects 1010, 1012, etc., acting as servers provide data services, such as receiving data from client computing devices or objects 1020, 1022, 1024, 1026, 1028, etc., storing of data, processing of data, transmitting data to client computing devices or objects 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the server objects 1010, 1012, etc. can be Web servers with which other computing devices or objects 1020, 1022, 1024, 1026, 1028, etc. communicate via any of a number of known protocols, such as the hypertext transfer protocol (HTTP). Server objects 1010, 1012, etc. acting as servers may also serve as clients, e.g., computing devices or objects 1020, 1022, 1024, 1026, 1028, etc., as may be characteristic of a distributed computing environment.

The subject matter described herein can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The word "exemplary" where used herein means serving as an example, instance, or illustration. For the avoidance of doubt, the subject matter disclosed herein is not limited by such examples. In addition, any aspect, embodiment or design described herein as "exemplary", "demonstrative", "illustrative", or the like, is not necessarily to be construed as preferred or advantageous over other aspects or designs, nor is it meant to preclude equivalent exemplary structures and techniques known to those of ordinary skill in the art.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method, comprising:
monitoring, by a system comprising a processor, a metric of communication between a network access point device and a device;
determining, by the system, an instance for which the metric satisfies a condition defined by a communication function, wherein the determining the instance comprises determining whether a report of a channel quality indicator satisfies an interference condition, defined by a network interference function, associated with an increasing wireless resource requirement at the network access point device in conjunction with maintaining a selected quality metric for provision of content for the device;
determining, by the system, a network service for the provision of the content for the device;
transmitting, by the system, a message to the network service related to modifying a resource usage parameter of the network service in response to the metric being determined to satisfy the condition defined by the communication function,
in response to the transmitting, modifying, by the system, the content or a delivery of the content in accordance with a value of a tiered transmission parameter, wherein the modifying comprises progressively obtaining a next lower value, than the value, of the tiered transmission parameter; and
in response to a determination that a restoration condition has been determined to have been satisfied, restoring, by the system, the tiered transmission parameter to a next higher value, than a current value, of the tiered transmission parameter.

2. The method of claim 1, further comprising:
in response to obtaining an indication of the network service for the provision of the content for the device, initiating, by the system, the monitoring.

3. The method of claim 1, wherein the report is a first report, and wherein the monitoring the metric of communication further comprises receiving a second report from the device indicative of the metric of communication.

4. The method of claim 1, wherein the monitoring the metric of communication further comprises obtaining an indication of radio quality data from the device representative of a quality of communication of a radio of the device.

5. The method of claim 1, wherein the monitoring the metric of communication further comprises receiving the report of the channel quality indicator from the device.

6. The method of claim 5, wherein the selected quality metric is a predetermined quality metric for the provision of the content for the device.

7. The method of claim 6, further comprising:
maintaining, by the system, the predetermined quality metric, wherein the maintaining the predetermined quality metric comprises satisfying a guaranteed quality of service, determined at the device and included with the report of CQI, for the provision of the content for the device.

8. The method of claim 1, wherein the transmitting the message to the network service comprises transmitting message data configured to cause the network service to transmit the content with an increased efficiency relative to the message data not being transmitted.

9. The method of claim 8, wherein the increased efficiency represented by the message data is configured to decrease a network access point resource requirement for the delivery of the content to the device.

10. The method of claim 8, wherein transmitting the content with the increased efficiency comprises:
reducing, by the system, a resolution or sampling rate of media data transmitted by the network service with the content.

11. The method of claim 1, further comprising:
in response to the transmitting the message, continuing, by the system, the monitoring of the metric of communication; and
determining, by the system, a second instance for which the metric fails to satisfy the condition defined by the communication function.

12. The method of claim 11, wherein the message is a first message, and wherein the method further comprises:
transmitting, by the system, a second message to the network service related to a second modifying of the resource usage parameter at least in part in response to the determining the second instance.

13. The method of claim 12, wherein the transmitting the second message facilitates restoring the resource usage parameter to an increased quality function from an increased efficiency function.

14. A system, comprising:
a memory to store instructions; and
a processor, communicatively coupled to the memory, that executes or facilitates execution of the instructions, the instructions comprising:
a service component configured to determine activation of a network delivery of content to a device that is connected to a network by a network access point device;
a monitoring component configured to obtain a quality metric related to a communication between the device and the network access point device;
an error correction component configured to determine whether the quality metric satisfies an error condition defined by a communication function associated with the communication, wherein a determination by the error correction component that the error condition has been determined to have been satisfied comprises a determination that a report of a channel quality indicator satisfies an interference condition, defined by a network interference function, associated with an increasing of a wireless resource requirement at the network access point device, and wherein the increasing of the wireless resource requirement is in conjunction with maintaining a selected quality metric for provision of content for the device;
a correction component configured to transmit a message to a network entity originating the content over the network in response to a communication problem being determined to satisfy the error condition, wherein the message facilitates the network entity originating the content to alter the content or a delivery of the content to facilitate a reduced resource consumption at the network access point device in conjunction with the communication, and wherein the reduced resource consumption comprises reducing the resource consumption in accordance with a value of a lower tier transmission parameter lower than a transmission parameter; wherein facilitation of the reduced resource consumption comprises progressively obtaining a next lower value of the lower tier transmission parameter; and
a mitigation component configured to, in response to a determination that a restoration condition has been determined to have been satisfied, restore the next lower value of the transmission parameter to a next higher value, than the next lower value of the transmission parameter.

15. The system of claim 14, wherein the service component is configured to receive a message indicative of the network delivery of the content to the device.

16. The system of claim 15, wherein the message indicative of the network delivery of the content is initiated at the network entity, the device or the network access point device.

17. The system of claim 14, wherein the monitoring component is configured to receive the quality metric in a transmission originated at the device.

18. The system of claim 17, wherein the quality metric is the channel quality indicator.

19. The system of claim 14, wherein the communication function relates the quality metric to resource requirements at the network access point device for delivering the content according to a quality parameter.

20. The system of claim 19, wherein the quality parameter is a guaranteed bitrate.

21. The system of claim 14, wherein the error correction component instructs the network access point device originating the content over the network to modify the content to reduce the resource consumption at the network access point device associated with the delivery of the content to the device.

22. The system of claim 21, wherein the error correction component instructs the network entity originating the content over the network to modify the content from a defined high definition media content format to a defined non-high definition media content format.

23. The system of claim 14, wherein:
the monitoring component is configured to obtain an instance of the quality metric following transmission of the message by the correction component; and
the error component is configured to determine that the instance of the quality metric does not satisfy the error condition defined by the communication function.

24. The system of claim 23, wherein the correction component is further configured to transmit a second message to the network entity originating the content to rescind the altering of the content or delivery of the content, in response to the instance of the quality metric not satisfying the error condition.

25. A system, comprising:
a memory to store instructions; and
a processor, communicatively coupled to the memory, that executes or facilitates execution of the instructions, the instructions comprising:
a transmission component configured to transmit content over a network targeting a client application operating on a device;
a messaging component configured to receive a request to modify the content or a delivery of the content in a manner configured to reduce resource consumption of a network access point device serving the device;
a monitoring component configured to obtain a quality metric related to the request, wherein the quality metric is determined to satisfy a condition related to the request based on a determination that a report of a channel quality indicator satisfies an interference condition defined by a network interference function, and wherein the interference condition is associated with an increasing wireless resource requirement at the network access point device in conjunction with maintaining a selected quality metric for provision of content for the device; and
a mitigation component configured to perform a modification of the content or delivery of the content in response to the request, wherein the mitigation component performs the modification in accordance with a requested tiered transmission parameter value, wherein the modification comprises chronologically obtaining a next lower value transmission parameter resulting in a current transmission parameter, other than the requested tiered transmission parameter value, and wherein the mitigation component is further configured to restore, in response to a determination that a restoration condition has been determined to have been satisfied, the current transmission parameter to a next higher value transmission parameter than the current transmission parameter.

26. The system of claim 25, wherein the mitigation component is configured to transmit the content according to a standard definition media format in response to the request.

27. The system of claim 26, wherein the transmission component is configured to receive a message rescinding the request.

28. The system of claim 27, wherein the mitigation component is configured to transmit the content according to a defined high definition media format in response to the message being determined to rescind the request.

29. A computer readable storage device comprising computer-executable instructions that, in response to execution, cause a system comprising a processor to perform operations, comprising:
initiating delivery of content having a guaranteed quality of service (QoS) policy over a network addressed to a client connected to the network;
receiving an indication of communication quality observed at the client;
determining whether the indication of communication quality satisfies a condition defined by a function that correlates client-measured communication quality with resource consumption associated with the delivery of the content according to the guaranteed QoS policy; and
modifying the content or the delivery of the content, resulting in a content modification, in a manner configured to reduce resource consumption associated with the delivery of the content in response to determining the indication of communication quality satisfies the condition, wherein the determining whether the indication of the communication quality satisfies the condition comprises determining whether a report of a channel quality indicator satisfies an interference condition, wherein the interference condition is associated with an increasing of a wireless resource requirement at the network in conjunction with maintaining a selected quality metric for provision of the content for the client, wherein the modifying comprises modifying the content or the delivery of the content in accordance with a reduced value of a transmission parameter lower than a first current value transmission parameter, and wherein the modifying comprises progressively reducing the reduced value of the transmission parameter to a second current value transmission parameter; and
in response to a determination that a restoration condition has been determined to have been satisfied, restoring the second current value transmission parameter to a next higher value transmission parameter than the second current value transmission parameter.

30. The computer readable storage device of claim 29, wherein the indication is a first indication, and wherein the operations further comprise:
- receiving a second indication of communication quality observed at the client;
- determining whether the second indication of communication quality satisfies the condition defined by the function; and
- revoking the content modification of the content or delivery of the content in response to determining the second indication of communication quality does not satisfy the condition.

* * * * *